United States Patent [19]

Saigusa

[11] 4,073,191

[45] Feb. 14, 1978

[54] DIFFERENTIAL PRESSURE TRANSDUCER

[75] Inventor: Tokuji Saigusa, Musashino, Japan

[73] Assignee: Yokogawa Electric Works, Ltd., Tokyo, Japan

[21] Appl. No.: 747,012

[22] Filed: Dec. 2, 1976

[51] Int. Cl.$^2$ .......................... G01L 7/08; G01L 9/12
[52] U.S. Cl. ...................................... 73/706; 73/718; 73/407 R; 361/283
[58] Field of Search ................ 73/398 C, 407 R, 395, 73/431, 420; 361/283

[56] References Cited

U.S. PATENT DOCUMENTS

| | | | |
|---|---|---|---|
| 3,058,350 | 10/1962 | Brown | 73/407 R |
| 3,559,488 | 2/1971 | Weaver | 73/407 R |
| 3,793,885 | 2/1974 | Frick | 73/398 C |

*Primary Examiner*—Donald O. Woodiel

*Attorney, Agent, or Firm*—Parmelee, Johnson, Bollinger & Bramblett

[57] ABSTRACT

A differential-pressure transducer of the type comprising a measuring diaphragm supported at its peripheral edges and its sides presented to respective internal chambers filled with a pressure-transmitting liquid, the chambers and the diaphragm being contained in a body mounted within the interior space of an outer housing, there also being provided a pair of seal diaphragms remote from the measuring diaphragm and establishing liquid-filled isolation chambers communicating with said internal chambers respectively, the opposite sides of the seal diaphragms being adpated to receive the pressures whose differential is to be measured, and the peripheries of the seal diaphragms being secured to the housing.

8 Claims, 4 Drawing Figures

DIFFERENTIAL PRESSURE TRANSDUCER

BACKGROUND OF THE INVENTION

1. Field of the Invention

The present invention relates to differential-pressure flow measurement and more particularly to differential pressure transducers capable of converting differential pressure into an electrical signal.

It is general practice to measure fluid flow rate by inserting into the flow pipe a restrictive means, such as an orifice, to obtain a pressure differential across the restrictive means corresponding to the flow rate of the fluid passing through the pipe. This differential pressure may be applied to a differential-pressure transducer to cause a displacement of means, such as a diaphragm, which displacement can be detected by electrical devices and converted into measurable electrical signals proportional to the displacement and hence to the differential pressure and fluid flow rate.

2. Description of the Prior Art

FIG. 1 of the within drawings illustrates a prior-art differential-pressure transducer of a type such as is disclosed for example in U.S. Pat. No. 3,618,390. The instrument of FIG. 1 includes a measuring diaphragm 1 mounted in a generally circular cross-section body 2 which has internal chambers 21 and 22 and may be formed of two body sections corresponding to the two chambers. Stretched seal diaphragms 31 and 32 are welded to the body at 33 and 34, together with first and second connecting members 41 and 42, on both sides of the body. The seal diaphragms 31 and 32 form isolation chambers 35 and 36 which communicate with the internal chambers 21 and 22 through passageways 23 and 24 respectively. The spaces formed therein are filled with a fluid such as silicone oil.

The body 2 with associated elements is installed as a unit in an internal space 51 in a housing 5. A third connecting member 52 integral with the housing 5 is welded to the second connecting member 42 at 53. A fourth connecting member 54 in the form of an annular plate is welded to the first connecting member 41 and housing 5 at 55 and 56. Covers 71 and 72 are fastened to the housing 5 on both sides, respectively, with bolts 81 and nuts 82. O-rings 91 and 92 are mounted between the first connecting member 41 and the cover 71 and between the second connecting member 42 and the cover 72 respectively. The O-rings 91 and 92, seal diaphragms 31 and 32, first and second connecting members 41 and 42, and covers 71 and 72 form chambers 73 and 74 respectively, into which the flowing fluid is introduced.

The pressures of the fluid in the chambers 73 and 74 act on the measuring diaphragm 1 from both sides via the seal diaphragms 31 and 32 and the seal fluid, causing the measuring diaphragm 1 to be displaced by the differential pressure. By detecting this displacement, the differential pressure can be measured. In the event an overpressure is applied, the measuring diaphragm 1 will bottom against the concave wall of either chamber 21 or 22 to obviate error in measurement.

In this type of device, the measuring diaphragm 1 and the body 2 are made of an elastic material, ordinarily the same for both. The housing 5 and the third and fourth connecting members 52 and 54 are made of carbon steel whose expansion coefficient is roughly similar to that of the diaphragm and body material. This serves to prevent the tension of the measuring diaphragm 1 from being altered by changes in temperature, thereby avoiding span error. The seal diaphragms 31 and 32, first and second connecting members 41 and 42, and covers 71 and 72 are of stainless steel, and the O-rings 91 and 92 are of a resilient material such as Teflon system rubber material to allow these elements to have high resistance to corrosion by the fluid being measured. The connecting members 41, 42, 52 and 54 located between the body 2 and the housing 5 allow a certain amount of deflection which compensates for variations in the tightening force of bolts 81 and nuts 82 to prevent the tension of the measuring diaphragm 1 from being altered.

Teflon system rubber materials in general are vulnerable to strongly corrosive chemicals such as hydrochloric acid. When the fluid being measured is hydrochloric acid or the like, therefore, the O-rings 91 and 92 will be replaced with silicon gaskets or metal O-rings. In practice, however, a great pressure must be applied to such elements to maintain substantial seal effect, with the result that a great force is exerted between the first and second connecting members 41 and 42 and covers 71 and 72. Consequently, variations in the force with which the covers 71 and 72 are fastened in position directly affect the force with which the body 2 is fastened in position, causing the tension of the measuring diaphragm 1 to be varied. In such construction, therefore, the connecting means 41, 42, 52 and 54 do not serve the needed function. Furthermore, because the covers 71 and 72, made of stainless steel whose expansion coefficient is considerably different from that of the elastic material used for the body 2, are connected axially to the body 2, the force with which the body 2 is fastened in position varies with changes in temperature, causing the tension of the measuring diaphragm 1 to be varied, so that span error will result.

SUMMARY OF THE INVENTION

In a preferred embodiment of the invention, to be described in detail hereinbelow, there is provided a transducer of the general type outlined above including (1) a measuring diaphragm mounted in a body defining two internal chambers on both sides of the measuring diaphragm, (2) a housing having an internal space in which the body is accomodated, (3) seal diaphragms forming isolation chambers, and (4) wherein the peripheries of the seal diaphragms are fastened to the housing. As will be apparent from the detailed description hereinbelow, the special construction of the inventive embodiment avoids or significantly reduces the disadvantages of the prior art instruments, discussed above, and especially provides an instrument particularly well suited for industrial process measurements.

DESCRIPTION OF THE PREFERRED EMBODIMENTS

Figure 1:
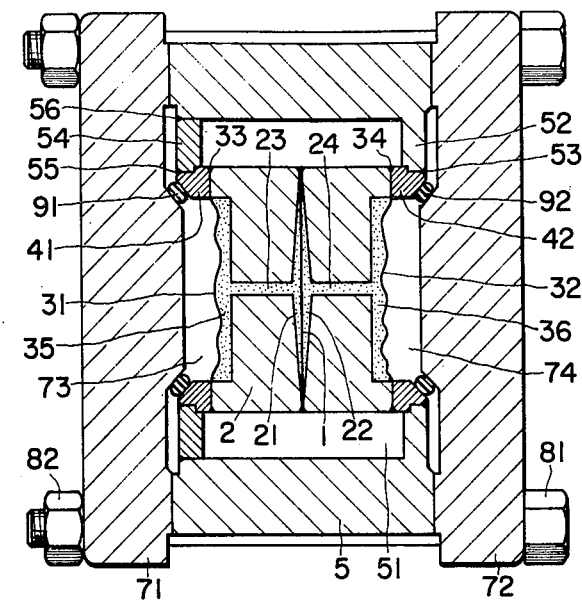
FIG. 1 is a sectional view illustrating a prior art transducer.
Figure 2:
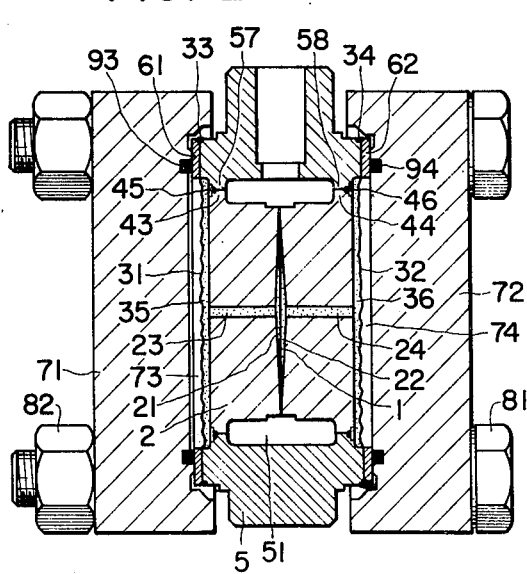
FIG. 2 is a sectional view illustrating features of a transducer constructed according to the present invention.

Referring now to FIG. 2, the differential pressure transducer comprises a measuring diaphragm 1 made of a flat disk, and a body 2 having internal chambers 21 and 22 on both sides of the measuring diaphragm 1 and annular projections 43 and 44 at the outer circumferential periphery. The projections 43 and 44 serve as elastic elements. Seal diaphragms 31 and 32 form isolation chambers 35 and 36 remote from the internal chambers 21 and 22.

A housing 5 is provided, having an internal space 51 for accommodating the body 2. The housing 5 has support projections 57 and 58, which are fastened to the projections 43 and 44 at 45 and 46 respectively, for example by welding, whereby the body 2 is held in position. Extending over the projections 43, 44 and support projections 57 and 58, the seal diaphragms 31 and 32 have their peripheries fastened to the housing 5 at 33 and 34, for example by welding. Rings 61 and 62 and gaskets 93 and 94 are provided to hold the seal diaphragms 31 and 32 against the housing 5. Covers 71 and 72 form chambers 73 and 74 into which the measuring pressures are introduced. The covers 71 and 72 are fastened to the housing 5 on both sides, via the gaskets 93 and 94 and the rings 61 and 62, with bolts 81 and nuts 82. Thus the chambers 73 and 74 into which the measuring pressures are introduced are sealed off by the seal diaphragms 31 and 32, the covers 71 and 72, the rings 61 and 62, and the gaskets 93 and 94.

Pressures exerted on the seal diaphragms 31 and 32 are directed to the two sides of the measuring diaphragm 1 by way of the noncompressive fluid filling the internal chambers 21 and 22, isolation chambers 35 and 36, and passageways 23 and 24. The measuring diaphragm 1 is displaced according to the difference between pressures exerted in the chambers 73 and 74. This displacement can be detected, for example as a change in static capacitance of capacitors comprising the sides of the internal chambers 21 and 22. In the event an overpressure is applied, the measuring diaphragm 1 will bottom out before the seal diaphragms 31 and 32 hit their opposite walls, and thus damage due to overpressure is prevented.

In accordance with one aspect of the invention, the seal diaphragms 31 and 32 have their peripheries fastened not to the body 2 but to the housing 5 which supports the body 2. As a result, the transducer can be constructed so that the gaskets 93 and 94 are located between the housing 5 and the covers 71 and 72. This makes it possible for the gaskets 93 and 94 to have sufficient allowance against stress, permitting the transducer of the invention to employ high corrosion-resistant gaskets such as Teflon gaskets without problem. Furthermore, because the housing 5 has portions with an elastic function to support the body 2 in the housing 5, the force accompanying tightening of bolts 81 and 82 is not exerted on the elastically functioning portions, the body 2 and the measuring diaphragm 1. This eliminates possibilities of causing the tension of the measuring diaphragm 1 to be altered with changes in such force.

Figure 3:
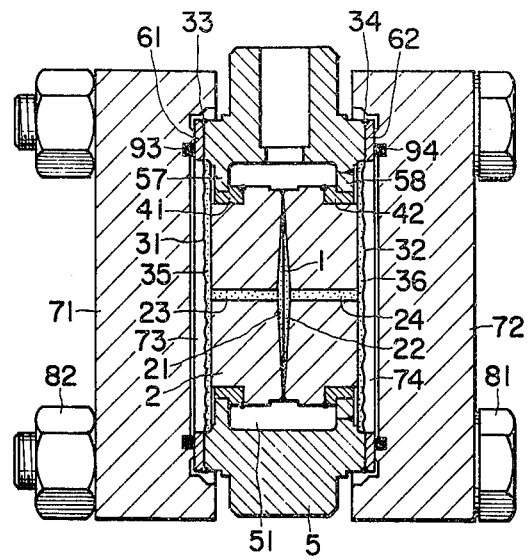
FIG. 3 is a sectional view of another transducer according to the invention.

FIG. 3 illustrates another embodiment of the invention in which stepped portions are formed in the outer edge of the body 2, ring-shaped connecting members 41 and 42 are installed on the stepped portions, and the body 2 is supported in position by way of these connecting members.

Figure 4:
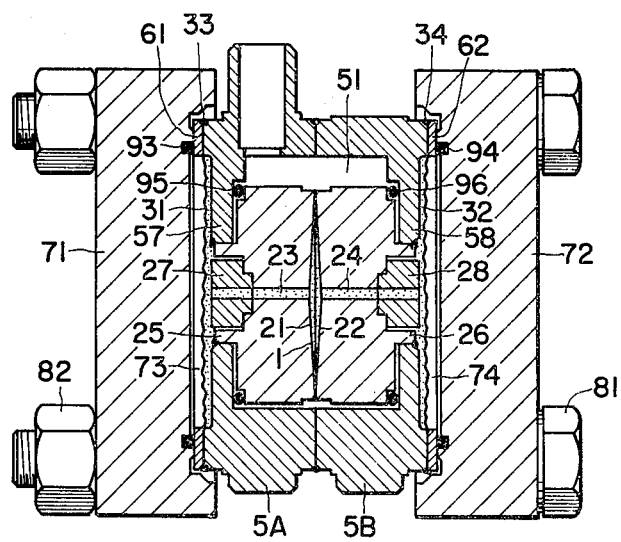
FIG. 4 is a sectional view of still another transducer according to the invention.

FIG. 4 illustrates another embodiment of the invention in which tubular portions 25 and 26 having an elastic function are formed on both sides of the body 2 and are welded to support projections 57 and 58 which extend from both ends of housings 5A and 5B. In this construction, the body 2 is suspended in an internal space 51 in the housings 5A and 5B. O-rings 93 and 94 having an elastic function are inserted between support projections 57 and 58 and the body 2. There are provided spacers 27 and 28 inserted in the tubular portions 25 and 26. Because the body 2 is supported by way of the tubular portions, variations in the force with which the bolts 81 and nuts 82 are tightened together and variations in the stress caused therein with temperature changes will to a considerable extent be absorbed by the tubular portions in the directions along the bolts, as well as in the radial direction. Accordingly, the body 2 and the measuring diaphragm 1 are safely protected against these stresses.

In the foregoing embodiments, the gaskets 93 and 94 are in contact with the rings 61 and 62. Instead of this arrangement, the gaskets 93 and 94 may be brought into direct contact with the seal diaphragms 31 and 32. By so arranging the design, all the welded portions are kept away from the measuring fluid. Further, although sealing with the gaskets 93 and 94 has been described, instead, sealing with metal O-rings, metal sealing or the like may be employed.

Briefly, in accordance with an important aspect of the invention, the body 2 is supported in the housing 5 by way of elements having an elastic function, and the seal diaphragms are fastened to the housing in such manner that their peripheries cover the elastically functioning elements. Thus, as described, the differential pressure transducer of the invention operates free of significant disadvantages of the prior art transducers.

Although preferred embodiments of the invention have been described herein in detail, it is desired to emphasize that this is for the purpose of illustrating the principles of the invention, and should not necessarily be construed as limiting of the invention since it is apparent that those skilled in this art can make many modified arrangements of the invention without departing from the true scope thereof.

I claim:

1. In a differential-pressure transducer of the type comprising: a measuring diaphragm mounted in a body forming two internal chambers on opposite sides of the measuring diaphragm; a housing having an internal space within which said body is elastically supported; seal diaphragms forming isolation chambers remote from said internal chambers and having sides subjected to measuring pressures; and fluid passageway means connecting each internal chamber to a respective isolation chamber;

that improvement wherein said seal diaphragms are fastened to said housing.

2. A differential-pressure transducer as claimed in claim 1 including ring-shaped connecting members providing said elastic support of said body.

3. A differential pressure transducer as claimed in claim 1 comprising tubular elements respectively on both sides of said body to provide said elastic support.

4. A differential-pressure transducer as claimed in claim 1 comprising covers mounted opposite to said seal diaphragms.

5. A differential-pressure transducer as claimed in claim 4 wherein said seal diaphragms are held between said covers and said housing.

6. A differential-pressure transducer as claimed in claim 5 including gaskets to hold said seal diaphragms between said covers and said housing.

7. A differential-pressure transducer as claimed in claim 6 further including annular rings cooperatively engaged with said gaskets to hold said seal diaphragms between said covers and said housing.

8. A differential-pressure transducer as claimed in claim 1 wherein said internal chambers are adapted to serve as capacitance plates so that a displacement of said measuring diaphragm is detected as a change in static capacitance.

* * * * *